Figure 8:
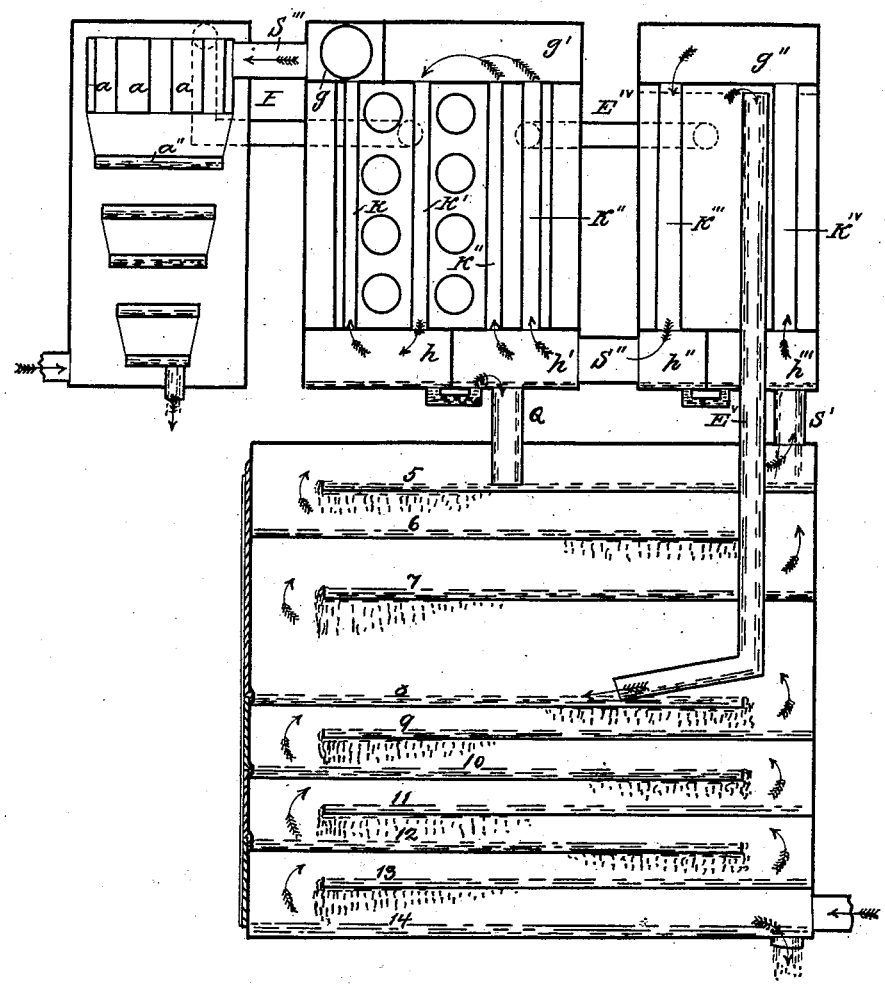

PRENTISS & ROBERTSON.
Apparatus for Distilling and Rectifying Whisky and other Spirits.
No. 41,819.
3 Sheets—Sheet 1.
Patented March 1, 1864.
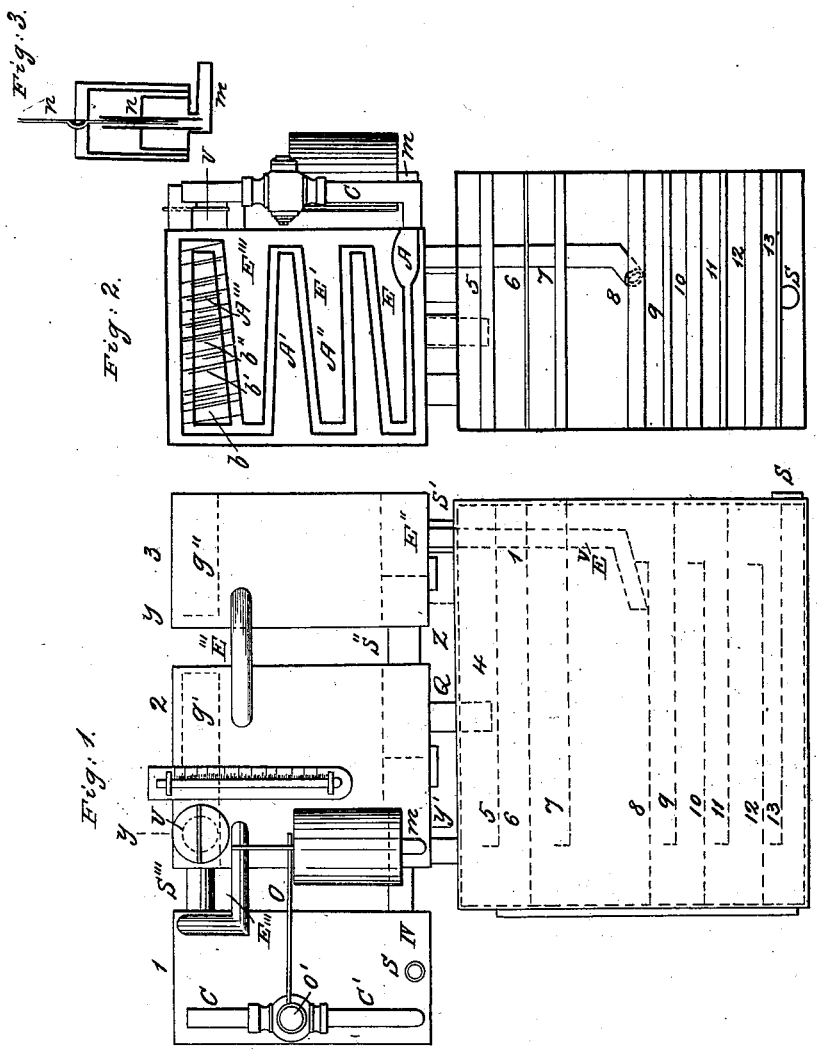

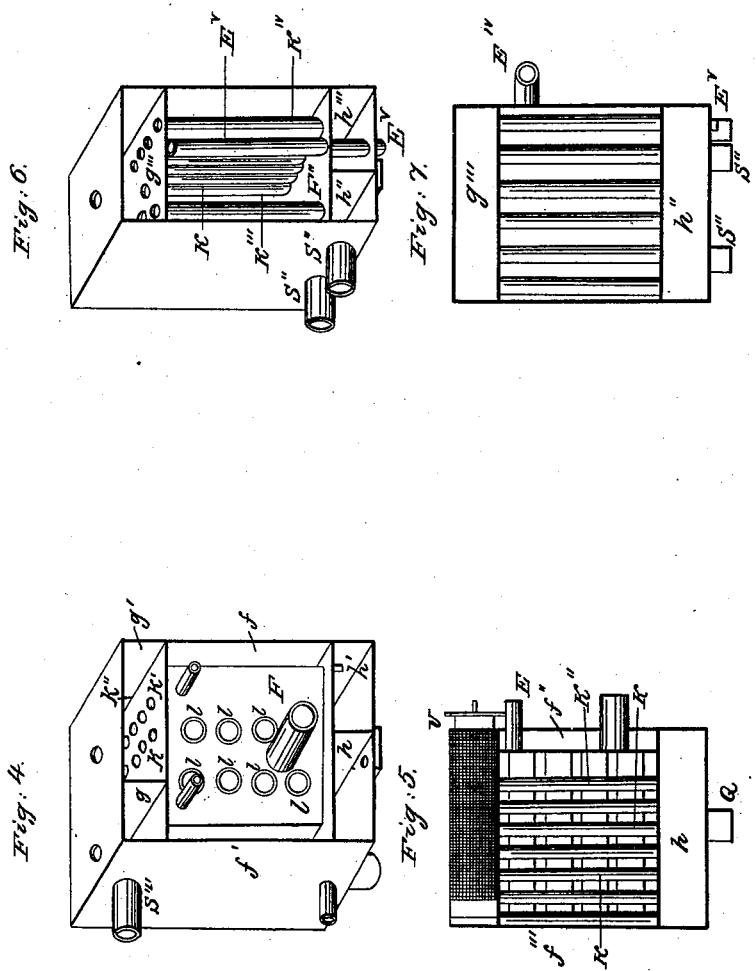

PRENTISS & ROBERTSON.
Apparatus for Distilling and Rectifying Whisky and other Spirits.

No. 41,819.

3 Sheets—Sheet 3.

Patented March 1, 1864.

UNITED STATES PATENT OFFICE.

ELIJAH FREEMAN PRENTISS, OF PHILADELPHIA, PENNSYLVANIA, AND ROBERT ADAM ROBERTSON, OF LIVERPOOL, ENGLAND.

IMPROVED APPARATUS FOR DISTILLING AND RECTIFYING WHISKY AND OTHER SPIRITS.

Specification forming part of Letters Patent No. 41,819, dated March 1, 1864.

*To all whom it may concern:*

Be it known that we, ELIJAH FREEMAN PRENTISS, of Philadelphia, and ROBERT ADAM ROBERTSON, of Liverpool, England, have invented a new and useful Apparatus for Distilling and Rectifying Whisky or other Spirits and Deodorizing and Flavoring them while in a State of Vapor; and we do hereby declare the following to be a full and exact description of the same, reference being had to the annexed drawings, in which—

Figure 1 is a side view of the exterior of the apparatus. Fig. 2 is a side view of the apparatus with the ends of the chambers removed. Fig. 3 is a thermostat or regulator. Fig. 4 is a view of the chamber No. 2 in Fig. 1 with the front removed. Fig. 5 is a transverse section of chamber No. 2 on the line Y Y' of Fig. 1. Fig. 6 is a view of chamber No. 3 with the end removed. Fig. 7 is a transverse section of chamber No. 3 on the line Z Z' of Fig. 1. Fig. 8 is a longitudinal section of the whole apparatus, showing its mode of operation.

Our apparatus consists of four main chambers, numbered on the drawings 1, 2, 3, and 4. Into chamber No. 1 "wash" or fermented fluid of any kind is introduced. (The term "wash" is used throughout the specification to denote the crude liquid which is to be distilled.) It (the wash) then passes through chambers Nos. 2, 3, and 4, in which it is distilled and rectified, and the "spent wash" escapes from the bottom of the fourth chamber, while the rectified and flavored spirit passes off at the bottom of chamber No. 1.

The construction, arrangement, and operation of these chambers are as follows: No. 1 is a cubical chamber, made of sheet-copper, say about four feet long, four feet high, and one foot broad. A flat worm of rectangular section, A A' A'', passes across the interior of this chamber from side to side, as shown in Fig. 2. At the top of this worm is a box, A''', of short tubes $b\ b'\ b''$, say about half-inch diameter and about six inches long. These tubes $b\ b'\ b''$ are placed vertically, and are secured by a plate above and below. The worm A A' A'' is connected at the bottom with an exterior tube, (S,$^{IV}$ Fig. 1, for discharging the spirit.) The wash is introduced through the exterior tube at C' into the space E E' E'' around the worm, and fills the interior of the chamber No. 1, and is colored pink in the sectional drawings, Fig. 8, and passes across through the tube E''' into chamber No. 2, which is arranged as follows: This chamber No. 2 is composed of an exterior vertical box of copper, say about four feet square on the base by about four feet high, and having within it an interior box, F, of the same shape, and about two inches smaller in the breadth, and about one foot smaller in the height, so as to form between it and the outer box vertical spaces $f\ f'\ f''$ about one inch wide, and upper spaces, $g\ g'$, six inches deep, and lower spaces, $h\ h'$, six inches deep. The interior box, F', is composed of a series of vapor-tubes, K K' K'', arranged vertically, about one-half inch in diameter, and extending from the upper spaces, $g\ g'$, to the lower spaces, $h\ h'$. There are also horizontal tubes $l\ l\ l$ arranged between the vertical tubes and extending from the front space, $f''$, to the rear space, $f'''$. These horizontal tubes $l\ l\ l$ and the front and rear and side spaces, $f\ f'\ f''\ f'''$, all communicate, and are intended to contain air for the purpose of acting on a heat-regulator by the expansion of the air so contained within the tubes $l\ l''\ l'''$ and the spaces $f\ f'\ f''\ f'''$. These air tubes and spaces are colored yellow in the sectional drawings, Fig. 8. The air-spaces communicate with a regulator (shown detached at Fig. 3 and in place at Fig. 2,) by means of a tube, $m$. This regulator is composed of an inverted cup, $n$, attached to a stem, $p$, resting on a small mercury bath. The air, expanded by the heat in chamber No. 2, enters through the tube $m$, passes to the interior of the cup $n$, and elevates it, and, through the medium of the stem $p$, the lever $o$ acts upon the cock $o'$ of the supply-pipe $c\ c'$, checking or admitting a supply of wash according as the chamber No. 2 increases or diminishes. The normal temperature to be maintained in this chamber varies with the strength of spirit desired to be produced, say from 160° to 180°, or thereabout. The wash which fills the chamber No. 1 passes across, as before stated, through E''' into the interior box, F, of chamber No. 2, and fills all the spaces in that box except the air and vapor tubes, and this wash, as before stated, is indicated by a pink color. The wash then passes across through E'''' into the interior chamber, F', of chamber No. 3. Chamber No. 3 is one foot wide, four feet high, and four feet long, and is constructed with an interior chamber, F', three feet high, thus leaving an upper space, $g''$, and lower spaces, $h''\ h'''$, of six inches depth each, as in chamber No. 2. This interior chamber, F', has a series of vertical tubes, $K'''\ K^{IV}$, communicating above and below with the upper space, $g''$, and lower spaces, $h''\ h'''$. The wash, (colored pink in the drawings,) passing across through E'''', fills all the interior space around the vertical tubes $K'''\ K^{IV}$, and passes down through the pipe $E^V$ into chamber No. 4. This chamber No. 4 is made of sheet-copper, six feet long, ten feet high, and four feet broad. Its interior is fitted with a series of shelves, 5, 6, 7, 8, 9, 10, and 11, &c., extending partially along the interior of the chamber, about two inches apart. These shelves are made of sheet-copper. The first one, shelf 5, extends from one end of chamber No. 4 to within about three inches of the front end, and has a ledge on the front end about one-half inch high. Shelf 6 extends from the opposite end of chamber No. 4 to within about three inches of the rear end, and has a similar ledge, and so each successive shelf, commencing alternately at front and rear and extending to within three inches of the opposite end of the chamber from that at which it commences. The lowest shelf is about six inches from the bottom of the chamber. An aperture, S, is placed at the bottom of chamber No. 4, through which steam, at the temperature of 212° or upward, is introduced. This steam is the agent in the distilling of the wash, &c., and this steam passes successively underneath and over each of the shelves 6 7 8, &c., and evaporates the spirit. The wash adheres to the under surface of the shelves as well as on the upper surface of the shelves. The vapor evolved by the heat of the steam in contact with the wash, rising from the wash, ascends until it reaches the top of chamber No. 4, where it passes through the vertical connecting-pipe S' into the lower space, $h'''$, of chamber No. 3, and through a portion of the vertical tubes $K^{IV}$ of chamber No. 3, and thence into the upper space, $g''$, of No. 3, and descends again through the remaining vertical tubes $K'''$ into the lower space, $h''$, of No. 3, whence it (the vapor) passes across through the pipes S'' into the lower space, $h'$, of chamber No. 2, and ascends through a portion of the vertical pipes $K''$ of chamber No. 2 into the upper space, $g'$, and down through the tubes K' into the lower space, $h$, and thence it ascends through the tubes K into the upper space, $g$, and thence through S''' into the spaces A, which communicate with the worm $A'\ A''$ A''' in chamber No. 1. The vapor finally condenses in this worm and is drawn off as distilled and rectified spirit. The course of the vapor is shown by the arrows and the uncolored portion of the drawings, Fig. 8. The blue color represents the spirit, which is condensed from the vapor as it passes along. The wash is introduced into the body of the chamber No. 1, and is shown in pink in Fig. 8, and surrounds the vapor tube or worm $A\ A'\ A''$, and, being cold, serves as the condensing-bath to the contents of the worm or final vapor tube $A\ A'\ A''$. The wash, heated somewhat in No. 1, passes thence through E''' into and fills the interior space of chamber No. 2 and forms the condensing-bath for the vapor-tubes $K\ K'\ K''$ in No. 2, and thence passes through $E^{IV}$ into the body of chamber No. 3, where it forms the condensing-bath for the vapor-tubes $K'''\ K^{IV}$ there. Thence the wash passes through the tube $E^V$ down to the shelf 8, and thence follows the surface of shelves 9, 10, 11, 12, and 13, encountering, as it flows along and drops from shelf to shelf, the entering steam, as before described.

The operation of our apparatus is as follows: We make use of the wash, on its way to the main distilling-chamber No. 4, as a condensing-bath to surround the tubes containing the vapor of the distilled spirit, and the wash pursues its course from the body of chamber No. 1 through chamber No. 2, chamber No. 3, chamber No. 4, (colored pink,) while the vapor is given off by the heat of the steam in chamber No. 4, and the vapor thus evolved, passing through chambers 3, 2, and 1, the watery spirits are condensed and the final condensation of the spirits takes place in chamber No. 1. The interior chamber No. 2 is maintained at any uniform desired temperature, say from 160° to 190° Fahrenheit, according to the desired strength of spirit, by means of the regulator above described. This regulator is set by a thermometer, which is bent so as to be inserted into the bath of wash in No. 2. The condensed watery spirit in chamber No. 3 flows backward from $h''$ into $h'''$ and through the ascending vapor-tube S' and drops into the shelf 5 of chamber No. 4. The watery vapor condensed in No. 2 passes from $h$ to $h'$ through a bent tube, and thence down the tube Q into the condensed liquid on shelf 5, the end of tube Q being below the surface of the liquid.

We introduce, by means of a sliding perforated wire or screen work case U, into the upper parts, $g$ or $g'$, of chamber No. 2, or into the upper part, $g''$, of No. 3, materials for deodorizing, purifying, and flavoring the spirit while in the condition of vapor, the vapor necessarily passing through these materials.

In the chambers 2 and 3 are apertures, as shown in the drawings, over the spaces $g\ g'\ g''$, left for the perforated cases or drawers, into which apertures may be inserted S-tubes for the purpose of introducing into the drawers liquid materials for deodorizing and flavoring when such are required in addition to the solid materials in the drawers.

What we claim, and desire to secure by Letters Patent, is—

1. The arrangement and combination of the chambers 1 and 2, whereby the liquid to be distilled is made to act as a cooling medium in chamber 1 and as a regulating medium in chamber 2, substantially in the manner described.

2. The employment of chamber No. 2, in combination with the regulator or its equivalent, for maintaining any constant or desired temperature, substantially as described.

3. The construction of the shelves in chamber 4, substantially as described.

4. The employment of one or more perforated cases, U, or its equivalent, in connection with either or both of the chambers 2 or 3, for deodorizing, purifying, or flavoring the distilled spirit while in the vaporous condition and before condensation, substantially as described.

5. The employment of chamber 3 for raising the wash before it is introduced into chamber 4 to a greater heat than said wash gets in chamber 2, substantially in the manner described.

ELIJAH FREEMAN PRENTISS.
ROBERT ADAM ROBERTSON.

Witnesses:
J. E. SHAW,
CHAS. B. HELFENSTEIN.